United States Patent
Garbey et al.

(10) Patent No.: US 12,291,459 B2
(45) Date of Patent: May 6, 2025

(54) PRECIPITATED SILICA AND PROCESS FOR ITS MANUFACTURE

(71) Applicant: RHODIA OPERATIONS, Aubervilliers (FR)

(72) Inventors: Pascaline Garbey, Saint-Cyr-au-Mont-d'Or (FR); Frédéric Colbeau-Justin, Leuville-sur-Orge (FR); Laure Bertry, Aubervilliers (FR)

(73) Assignee: RHODIA OPERATIONS, Paris (FR)

( * ) Notice: Subject to any disclaimer, the term of this patent is extended or adjusted under 35 U.S.C. 154(b) by 371 days.

(21) Appl. No.: 17/618,904

(22) PCT Filed: Jun. 23, 2020

(86) PCT No.: PCT/EP2020/067464
§ 371 (c)(1),
(2) Date: Dec. 14, 2021

(87) PCT Pub. No.: WO2020/260262
PCT Pub. Date: Dec. 30, 2020

(65) Prior Publication Data

US 2022/0306480 A1    Sep. 29, 2022

(30) Foreign Application Priority Data

Jun. 27, 2019 (EP) .................................... 19305861

(51) Int. Cl.
*C01B 33/193* (2006.01)

(52) U.S. Cl.
CPC ................................. *C01B 33/193* (2013.01)

(58) Field of Classification Search
CPC .................................................. C01B 33/193
See application file for complete search history.

(56) References Cited

U.S. PATENT DOCUMENTS

| | | | |
|---|---|---|---|
| 2,441,422 A | 5/1948 | Krieble et al. | |
| 2,945,817 A | 7/1960 | Goldblum | |
| 4,454,288 A * | 6/1984 | Lee ........................... | C09C 3/12 524/588 |
| 10,995,218 B2 * | 5/2021 | Schneider ............. | C09C 1/3081 |
| 11,104,583 B2 * | 8/2021 | Boivin ................. | C08K 5/1539 |
| 2005/0032965 A1 * | 2/2005 | Valero ...................... | C08K 3/36 524/493 |
| 2007/0276078 A1 * | 11/2007 | Pottier ..................... | C08K 9/06 524/492 |
| 2011/0179970 A1 * | 7/2011 | Zschunke ................ | C09D 7/67 977/773 |
| 2020/0308412 A1 * | 10/2020 | Schneider ............. | C01B 33/193 |

FOREIGN PATENT DOCUMENTS

| | | | | |
|---|---|---|---|---|
| CN | 109071240 A | * | 12/2018 | ........... C01B 33/187 |
| DE | 102005043202 A1 | | 3/2007 | |
| EP | 1559744 A1 | | 8/2006 | |
| EP | 2325141 A1 | | 5/2011 | |
| WO | 2018019373 A1 | | 2/2018 | |
| WO | WO-2018202752 A1 | * | 11/2018 | .............. B01J 21/08 |

OTHER PUBLICATIONS

Dierkes et al. Report presented at Fall 186th Technical Meeting of Rubber Division, ACS, Oct. 14-16, 2014 (Year: 2014).*

* cited by examiner

*Primary Examiner* — Samir Shah
*Assistant Examiner* — Jordan W Taylor
(74) *Attorney, Agent, or Firm* — Osha Bergman Watanabe & Burton LLP

(57) ABSTRACT

A chemically modified precipitated silica characterised by the presence of methyl moieties chemically bound to the silica and a process for its manufacture.

11 Claims, No Drawings

PRECIPITATED SILICA AND PROCESS FOR ITS MANUFACTURE

This application is a U.S. national stage entry under 35 U.S.C. § 371 of international patent application No. PCT/EP2020/067464 filed on Jun. 23, 2020, which claims priority to European patent application No. 19305861.7, filed on Jun. 27, 2019, the whole content of this application being explicitly incorporated herein by reference.

TECHNICAL FIELD

The present invention relates to chemically modified precipitated silica and to a process for its manufacture.

BACKGROUND ART

The use of precipitated silica as a reinforcing filler in polymeric compositions is known. Chemical modification of the precipitated silica surface with organosilicon compounds to improve the compatibility of precipitated silica with the polymeric matrix is also known. Chemical modification is generally performed on the precipitated silica at the end of the silica precipitation process and often as an additional step after drying.

It has now been found that a chemically modified precipitated silica, capable to provide compositions having good heat dissipation properties, can be obtained by modification during the silica precipitation reaction by using alkali metal alkyl siliconates. The presence of alkali metal alkyl siliconates in the reaction medium during specific stages of the silica precipitation process allows the formation of silica chemically modified with alkyl groups. The silica chemical modification takes place during the precipitation process, without the need of any subsequent modification step.

The use of alkali metal alkyl siliconates in the preparation of modified precipitated silica has been disclosed for instance in WO 2018/019373, which discloses a process which comprises the reaction of an acid, a compound selected from a precipitated silica and/or $[SiO_{4/2}]$ precursor material and an organosiliconate, wherein the modification reaction takes place during or directly after the reaction to produce the precipitated silica. The precipitated silica obtained from the process has a low content of salts and finds use as reinforcing filler in silicone elastomer composition, in toners or developers.

It has now been found that if the precipitation process comprises a step performed at low pH which is followed by one performed at higher pH during which alkali metal methylsiliconate is added to the reaction medium, the precipitated silica which is obtained is capable of improving the heat dissipation properties of elastomeric compositions and/or the curing behavior of the same. Tires comprising said elastomeric compositions are characterized among others by reduced rolling resistance.

SUMMARY OF INVENTION

A first objective of the present invention is to provide a novel chemically modified precipitated silica which can be used, for instance, as reinforcing filler in polymeric compositions. A second objective of the invention is to provide a process for the manufacture of the chemically modified precipitated silica.

The inventive precipitated silica is characterised, among alia, by the presence of methyl groups covalently attached to the silica. The inventive silica is defined in detail in the description that follows and in the claims and the examples.

DESCRIPTION OF INVENTION

The precipitated silica of the invention comprises units of formula $[SiO_{4/2}]$ and units of formula $[(CH_3)SiO_{3/2}]$ and it is characterised by the fact that in the $^{13}C$ NMR spectrum of the precipitated silica two resonance peaks assigned to the methyl group are present: a first one in the region between −2.0 and −5.0 ppm and a second one in the region between −5.5 and −9.0 ppm and the ratio (intensity of the second peak)/(intensity of the first peak) is greater than 0.40.

The expression "resonance peak between −X and −Y ppm" is used herein to indicate that the value of the maximum of the resonance peak is present in the area of the $^{13}C$ NMR spectrum between −X and −Y ppm when the chemical shift scale is calibrated with the resonances of adamantane (at 38.5 ppm and 29.4 ppm).

It is observed that the resonances assigned to the methyl groups in the inventive silica are shifted with respect to the resonances of the same methyl groups of the alkali metal methyl siliconate used in the preparation of the precipitated silica. For instance, when the alkali metal methyl siliconate is potassium methyl siliconate, the single methyl resonance at −1.1 ppm is split in a first peak between −2.0 to −5.5 ppm and a second peak between −5.5 and −9.0 ppm. The first peak may be between −3.0 to −5.0 ppm. The second peak may be between −6.5 to −8.5 ppm.

The ratio (intensity of the second peak)/(intensity of the first peak) is greater than 0.40. The ratio (intensity of the second peak)/(intensity of the first peak) is preferably equal to or greater than 0.45, even equal or greater than 0.50, still equal to or greater than 0.52.

The ratio (intensity of the second peak)/(intensity of the first peak) can be as high as 5.00.

The ratio (intensity of the second peak)/(intensity of the first peak) can be between 0.40 and 5.00, even between 0.45 and 3.00, between 0.45 and 2.00, still between 0.45 and 1.60, between 0.50 and 1.60.

The inventive silica comprises methyl groups chemically bound to at least a portion of the Si atoms in the silica structure.

In the present specification, the terms "silica" and "precipitated silica" are used as synonyms. The expression "precipitated silica" defines an amorphous silica which is produced by the acidification of solutions of sodium silicate, followed by filtration of the precipitate and drying in the absence of any step wherein water is extracted from the precipitate using an organic solvent, e.g. an alcohol, or a supercritical fluid.

The precipitated silica of the invention has a carbon content of at least 0.2 wt %, typically from 0.2 wt % to 10.0 wt %. Throughout the present text the carbon content is defined as the amount of carbon by weight with respect to the total weight of silica. The carbon content represents the amount of methyl moieties chemically bound to the precipitated silica. The carbon content is typically less than 10.0 wt %, and it may be even less than 5.0 wt %. Advantageously, the carbon content is from 0.2 wt % to 5.0 wt %, even from 0.3 to 4.0 wt %. The carbon content may be from 0.2 wt % to 3.5 wt %, even from 0.3 to 3.0 wt %, preferably from 0.3 to 2.0 wt %.

The expressions wt % and % by weight are used as synonyms.

In general, the precipitated silica according to the invention has a CTAB surface area of between 40 and 600 $m^2/g$.

The CTAB surface area may be at least 50 m²/g, at least 60 m²/g, at least 80 m²/g, even at least 120 m²/g, at least 160 m²/g, at least 205 m²/g, at least 210 m²/g. The CTAB surface area may be at most 450 m²/g, at most 380 m²/g, even at most 300 m²/g. The CTAB surface area may be in particular between 50 and 450 m²/g, especially between 60 and 380 m²/g, for example between 80 and 300 m²/g.

In an embodiment the inventive precipitated silica is characterized by:
- a CTAB surface area between 40 m²/g and 600 m²/g, preferably between 50 m²/g and 380 m²/g, more preferably between 60 m²/g and 300 m²/g; and
- a carbon content from 0.2 wt % to 3.5 wt %, preferably from 0.3 wt % to 3.0 wt %.

A further feature of the inventive silica is the large median particle size (particle diameter) d50 for a given CTAB surface area value. In particular, it has been found that the median particle size of the inventive silica, at a given CTAB surface area, is higher than the value measured on known organically modified precipitated silicas.

It has been found that the median particle size d50 and the CTAB surface area of the inventive silica are such that:

$$|d50| > 164.5 - 0.3 * |CTAB| \quad (I).$$

In equation (I), $|CTAB|$ represents the numerical value of the CTAB surface area expressed in m²/g. $|CTAB|$ is an dimensional number. As an example if the measured value of CTAB is 200 m²/g, $|CTAB|$ is 200.

In equation (I), $|d50|$ represents the numerical value of the median particle size d50 measured by centrifugal sedimentation and expressed in nm. As an example if the value of d50 measured by centrifugal sedimentation is 100 nm, $|d50|$ is 100. d50 represents the diameter below (and above) which 50% of the total mass of aggregates is found. Thus, d50 represents the median particle size of a given distribution, wherein the term "size" in this context has to be intended as "diameter". $|d50|$ is an dimensional number.

The precipitated silica according to the invention typically has a BET surface area of between 45 m²/g and 650 m²/g, in particular between 70 m²/g and 500 m²/g, even between 90 and 400 m²/g, for example between 90 and 370 m²/g. BET surface area may be determined according to the Brunauer-Emmett-Teller method as detailed in standard NF ISO 5794-1, Appendix E (June 2010).

The precipitated silica according to the invention has a packing density, measured according to standard ISO 787/11, of at most 0.50 g/cm³, preferably of 0.15 to 0.50 g/cm³, in particular between 0.15 and 0.40 g/cm³.

The inventive precipitated silica may advantageously be obtained by a process which comprises the reaction of a silicate with an acid to produce a suspension of precipitated silica, said reaction comprising at least one step wherein at least one alkali metal methyl siliconate is provided to the reaction medium after 50% of the precipitation reaction has taken place.

A second object of the invention is thus a process for preparing the inventive precipitated silica.

The term "silicate" is used herein to refer to one or more than one silicate which can be added during the course of the inventive process. The term "silicate" is used herein to refer to a compound selected from the group consisting of the alkali metal silicates. Advantageously, it is selected from the group consisting of sodium and potassium silicate. The silicate may be in any known form, such as metasilicate or disilicate.

In the case where sodium silicate is used, the latter generally has an $SiO_2/Na_2O$ weight ratio of between 2.0 and 4.0, in particular between 2.4 and 3.9, for example between 3.1 and 3.8.

The silicate is generally provided as a solution which typically has a concentration of between 3.9 wt % and 25.0 wt %, for example between 5.6 wt % and 23.0 wt %, in particular between 5.6 wt % and 20.7 wt %. Throughout the text silicate concentration in a solution is expressed in terms of the amount by weight of $SiO_2$.

The term "acid" is used herein to refer to one or more than one acid which can be added during the course of the inventive process. Any acid may be used in the process. Use is generally made of a mineral acid, such as sulfuric acid, nitric acid or hydrochloric acid, or of an organic acid, such as acetic acid, formic acid or carbonic acid. Sulfuric acid is preferred.

The acid may be metered into the reaction medium in diluted or concentrated form. The same acid at different concentrations may be used in different stages of the process.

In a preferred embodiment of the process sulfuric acid and sodium silicate are used in all the stages of the process.

The inventive process is characterized by the fact that the at least one alkali metal methyl siliconate is added to the reaction medium after 50% of the precipitation reaction has taken place.

The expression "after 50% of the precipitation reaction has taken place" is used herein to indicate any stage of the process in which the amount of $SiO_2$ that has been generated up to said given stage is more than 50 wt % of the final amount of $SiO_2$ produced in the process.

Depending on the process, the percentage of silica precipitation may be monitored in different manners. In one variant of the process, formation of 50 wt % of the total amount of silica corresponds to the addition to the reaction medium of 50% of the total amount of silicate to be added during the process.

In an alternative variant, formation of 50 wt % of the total amount of silica is achieved when the neutralization ratio for the reaction medium reaches 50%. The term "neutralization ratio" is defined as the ratio between the number of $H^+$ moles generated by the acid added to the reaction medium and the number of moles of alkali metal deriving from the silicate in the reaction medium.

Notable examples of suitable alkali metal methyl siliconates are those of general formula (II):

or (III):

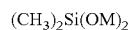

wherein n is an integer from 1 to 6, especially from 1 to 3, preferably 1; and M is an alkali metal, preferably sodium or potassium.

Preferably the alkali metal methyl siliconate is selected from sodium or potassium methyl siliconate.

The inventive process comprises the steps of:
(i) providing a starting solution with a pH of between 2.0 and 5.0, preferably between 2.5 and 5.0;
(ii) simultaneously adding silicate and an acid to said starting solution, such that the pH of the resulting reaction medium is maintained between 2.0 and 5.0;
(iii) stopping the addition of the acid, while continuing the addition of the silicate to the reaction medium until a pH value of the reaction medium of between 7.0 and 10.0 is obtained;

(iv) simultaneously adding silicate and acid to the reaction medium obtained in (iii), such that the pH is maintained between 7.0 and 10.0; and (v) stopping the addition of the silicate while continuing the addition of the acid to the reaction medium until a pH value of the reaction medium of less than 6.0 is reached and a silica suspension is obtained, characterized in that at least one alkali metal methyl siliconate is metered into the reaction medium in step (iv) or (v).

Addition of the alkali metal methyl siliconate takes place after 50% of the total amount of silicate is added to the reaction medium. The total amount of silicate to obtain a given final amount of silica can be determined by the person skilled in the art at the beginning of the process, according to common general knowledge.

In a first embodiment of the process, the addition of the totality of the alkali metal methyl siliconate takes place during step (iv).

In a second embodiment of the process, the addition of the totality of the alkali metal methyl siliconate takes place during step (v).

In a first aspect of said embodiment, step (v) comprises two phases, a first phase wherein the acid and the alkali metal methyl siliconate are simultaneously metered into the reaction medium at a pH between 7.0 and 10.0 followed by a second phase wherein the addition of the alkali metal methyl siliconate is stopped while the addition of the acid is continued and the pH of the reaction medium is allowed to decrease below 6.0.

The process may comprise additional steps, notably steps wherein the pH is further varied by the addition of silicate and/or acid to the reaction medium.

Without wishing to be bound by theory, it is believed that combination of a first precipitation phase performed at a pH between 2.5 and 5.0 with the addition of the alkali metal methyl siliconate after 50% of the precipitation reaction has taken place allows the incorporation of the methyl moieties of the alkali metal alkyl siliconate in different parts of the structure of the precipitated silica, as shown by the existence of different methyl groups in the NMR spectrum of the product.

In all the process embodiments outlined above and regardless of the stage of addition of the at least one alkali metal methyl siliconate, the cumulative amount of said compound metered into the reaction medium is at least 0.5 wt %, typically at least 1.0 wt %, even at least 5.0 wt %. The total amount of the at least one alkali metal methyl siliconate typically does not exceed 10.0 wt %. Suitable ranges are generally from 1.0 to 10.0 wt %, from 2.0 to 10.0 wt %, even from 2.0 to 8.0 wt %. The amount of alkali metal methyl siliconate is calculated with respect to the silica concentration in the starting solution (calculated as the sum of the initial amount of silicate and the initial amount of alkaly metal methyl siliconate).

The cumulative amount of said compound metered into the reaction medium is such that the carbon content in the precipitated silica is at least 0.2 wt %, typically from 0.2 to 10.0 wt %. The rate of addition of alkali metal methyl siliconate can be adapted to obtain the desired content of methyl moieties in the precipitated silica by means known to the person skilled in the art.

The reaction vessel in which the entire reaction of the silicate with the acid is performed is usually equipped with adequate stirring and heating equipment.

The entire reaction of the silicate with the acid is generally performed at a temperature of between 40 and 96° C., in particular between 80 and 95° C. According to one variant of the invention, the entire reaction of the silicate with the acid is performed at a constant temperature, usually of between 40 and 96° C., in particular between 80 and 95° C.

According to another variant of the invention, the temperature at the end of the reaction is higher than the temperature at the start of the reaction: thus, the temperature at the start of the reaction is preferably maintained at between 40 and 80° C. and the temperature is then increased, preferably up to a value of between 80 and 96° C., at which value it is maintained up to the end of the reaction.

At the end of the steps that have just been described for each of the process embodiments, a suspension of precipitated silica is obtained, which is subsequently subjected to a separation step (liquid/solid separation). The process, in all of its embodiments, thus typically comprises a further step of filtering the suspension of precipitated silica and drying the precipitated silica. The process does not comprise any step wherein water is extracted from the precipitate using an organic solvent, e.g. an alcohol, or a supercritical fluid.

The separation usually comprises a filtration, followed by washing, if necessary. The filtration is performed according to any suitable method, for example by means of a belt filter, a rotary filter, for example a vacuum filter, or, preferably a filter press.

The filter cake is then subjected to a liquefaction operation. The term "liquefaction" is intended herein to indicate a process wherein a solid, namely the filter cake, is converted into a fluid-like mass. After the liquefaction step the filter cake is in a flowable, fluid-like form and the precipitated silica is in suspension.

The liquefaction step may comprise a mechanical treatment which results in a reduction of the granulometry of the silica in suspension. Said mechanical treatment may be carried out by passing the filter cake through a high shear mixer, a colloidal-type mill or a ball mill. Optionally, the liquefaction step may be carried out by subjecting the filter cake to a chemical action, for instance by addition of water or an acid. The mechanical and chemical treatments may be both carried out. The suspension of precipitated silica which is obtained after the liquefaction step is subsequently dried.

Drying may be performed according to means known in the art. Preferably, the drying is performed by atomization. To this end, use may be made of any type of suitable atomizer, in particular a turbine, nozzle, liquid pressure or two-fluid spray-dryer.

When the drying operation is performed using a nozzle spray-dryer, the precipitated silica that may then be obtained is usually in the form of substantially spherical beads. After this drying operation, it is optionally possible to perform a step of milling or micronizing on the recovered product; the precipitated silica that may then be obtained is generally in the form of a powder.

Finally, the dried, milled or micronized product as indicated previously may optionally be subjected to an agglomeration step, which consists, for example, of direct compression, wet granulation (i.e. with use of a binder, such as water, silica suspension, etc.), extrusion or, preferably, dry compacting. The precipitated silica that may then be obtained via this agglomeration step is generally in the form of granules.

The inventive precipitated silica can be used in a number of applications, such as the manufacture of thermally insulating materials. The inventive precipitated silica can also be used in the preparation of resorcinol-formaldehyde/silica composites, as absorbent or as additive in concrete or paper.

The inventive precipitated silica may find a particularly advantageous application as filler in polymeric compositions.

Thus a further object of the present invention is a composition comprising the inventive precipitated silica. The composition advantageously comprises the inventive precipitated silica and at least one polymer. The at least one polymer can be selected among the thermosetting polymers and the thermoplastic polymers. Notable, non-limiting examples of thermosetting polymers include thermosetting resins such as epoxy resins, unsaturated polyester resins, vinyl ester resins, phenolic resins, epoxy acrylate resins, urethane acrylate resins, phenoxy resins, alkyd resins, urethane resins, maleimide resins, and cyanate resins.

Notable, non-limiting examples of suitable thermoplastic polymers include styrene-based polymers such as polystyrene, (meth)acrylic acid ester/styrene copolymers, acrylonitrile/styrene copolymers, styrene/maleic anhydride copolymers, ABS, ASA, and AES; acrylic polymers such as polymethylmethacrylate; polycarbonates; polyamides; polyesters, such as polyethylene terephthalate and polybutylene terephthalate; polyphenylene ethers; polysulfones; polyaryletherketones; polyphenylene sulfides; thermoplastic polyurethanes; polyolefins such as polyethylene, polypropylene, polybutene, poly-4-methylpentene, ethylene/propylene copolymers, ethylene/α-olefins copolymers; copolymers of α-olefins and various monomers, such as ethylene/vinyl acetate copolymers, ethylene/(meth)acrylic acid ester copolymers, ethylene/maleic anhydride copolymers, ethylene/acrylic acid copolymers; aliphatic polyesters such as polylactic acid, polycaprolactone, and aliphatic glycol/aliphatic dicarboxylic acid copolymers.

The inventive silica may advantageously be employed as reinforcing filler in elastomeric compositions. Accordingly a preferred object of the invention is a composition comprising the inventive silica and one or more elastomers. Elastomers preferably exhibit at least one glass transition temperature between −150° C. and +300° C., for example between −150° C. and +20° C.

For example, use may be made of elastomers deriving from aliphatic or aromatic monomers, comprising at least one unsaturation such as, in particular, ethylene, propylene, butadiene, isoprene, styrene, acrylonitrile, isobutylene or vinyl acetate, polybutyl acrylate, or their mixtures. Mention may also be made of functionalized elastomers, that is elastomers functionalized by chemical groups positioned along the macromolecular chain and/or at one or more of its ends (for example by functional groups capable of reacting with the surface of the silica), and halogenated polymers.

Notable non-limiting examples of suitable elastomers are diene elastomers. Among diene elastomers mention may be made, for example, of polybutadienes (BRs), polyisoprenes (IRs), butadiene copolymers, isoprene copolymers, or their mixtures, and in particular styrene/butadiene copolymers (SBRs, in particular ESBRs (emulsion) or SSBRs (solution)), isoprene/butadiene copolymers (BIRs), isoprene/styrene copolymers (SIRs), isoprene/butadiene/styrene copolymers (SBIRs), ethylene/propylene/diene terpolymers (EPDMs), and also the associated functionalized polymers (exhibiting, for example, pendant polar groups or polar groups at the chain end, which can interact with the silica).

Mention may also be made of natural rubber (NR) and epoxidized natural rubber (ENR).

The polymer compositions can be vulcanized with sulfur or crosslinked, in particular with peroxides or other crosslinking systems (for example diamines or phenolic resins).

In general, the polymer compositions additionally comprise at least one (silica/polymer) coupling agent and/or at least one covering agent; they can also comprise, inter alia, an antioxidant.

Notable non-limiting examples of coupling agents are for instance "symmetrical" or "unsymmetrical" silane polysulfides; mention may more particularly be made of bis((C1-C4)alkoxyl(C1-C4)alkylsilyl(C1-C4)alkyl) polysulfides (in particular disulfides, trisulfides or tetrasulfides), such as, for example, bis(3-(trimethoxysilyl)propyl) polysulfides or bis (3-(triethoxysilyl)propyl) polysulfides, such as triethoxysilylpropyl tetrasulfide. Mention may also be made of monoethoxydimethylsilylpropyl tetrasulfide. Mention may also be made of silanes comprising masked or free thiol functional groups or thioester groups, such as 3-octanoylthio-1-propyltriethoxysilane.

The proportion by weight of the inventive silica in the polymer composition can vary within a fairly wide range. It normally represents from 10% to 200%, in particular from 20% to 160% of the amount by weight of the polymer(s). In one embodiment the inventive precipitated silica may represent from 20% to 80%, for example from 30% to 70%, of the amount by weight of the polymer(s). In an alternative embodiment, it may represent from 80% to 140%, for example from 90% to 120%, of the amount by weight of the polymer(s).

A specific object of the present invention is a composition comprising the inventive precipitated silica, typically in an amount from 20% to 160% of the amount by weight of the polymer(s), and at least one polymer selected from the group consisting of the diene elastomers as detailed above, natural rubber and epoxidized natural rubber.

The silica according to the invention can advantageously constitute all of the reinforcing inorganic filler and even all of the reinforcing filler of the polymer composition.

The compositions comprising the precipitated silica of the invention may be used for the manufacture of a number of articles. Non-limiting examples of finished articles comprising the inventive precipitated silica and the compositions described above, are for instance footwear soles, floor coverings, gas barriers, flame-retardant materials and also engineering components, such as rollers for cableways, seals for domestic electrical appliances, seals for liquid or gas pipes, braking system seals, pipes (flexible), sheathings (in particular cable sheathings), cables, engine supports, battery separators, conveyor belts, or transmission belts. The inventive compositions are can advantageously be used in the manufacture of tires and tire components.

A further object of the invention is a tire or tire component comprising the inventive precipitated silica.

Should the disclosure of any patents, patent applications, and publications which are incorporated herein by reference conflict with the description of the present application to the extent that it may render a term unclear, the present description shall take precedence.

The invention will be now described with reference to the following examples, whose purpose is merely illustrative and not intended to limit the scope of the invention.

EXAMPLES

Analytical Methods

The physicochemical properties of the precipitated silica of the invention were determined using the methods described hereafter.

CTAB Surface Area

The CTAB surface area was determined according to standard NF ISO 5794-1, Appendix G (June 2010).

Determination of Total Carbon Content

The total carbon content was measured using a carbon/sulfur analyzer, such as Horiba EMIA 320 V2. The principle of the carbon/sulfur analyzer is based on the combustion of a solid sample in a stream of oxygen in an induction furnace (adjusted to approximately 170 mA) and in the presence of combustion accelerators (approximately 2 g of tungsten (in particular Lecocel 763-266), approximately 1 g of iron and approximately 0.25 g of tin). The carbon present in the sample to be analyzed (weight of approximately 0.2 g) combines with the oxygen to form $CO_2$, CO. These gases are subsequently analyzed by an infrared detector. The moisture from the sample and the water produced during these oxidation reactions is removed by passing over a cartridge comprising a dehydrating agent (magnesium perchlorate) in order not to interfere with the infrared measurement.

The result is expressed as percentage by weight of elemental carbon with respect to the total weight of the silica sample.

$^{13}$C NMR Spectroscopy

The product was characterized by 1D $^{13}$C MAS NMR spectroscopy on a Bruker Avance solid 300 spectrometer working at 7.04 T. A commercial 4 mm high speed probe (DVT4) with a spinning frequency of 10 KHz was used in cross polarization with 90° pulse, a 3 ms contact time and a 5 sec recycling time and 10000-20000 transients. The area of the spectrum analysed for the identification of the methyl resonances was from −15 to 10 ppm.

Calibration was done with respect to adamantane, which is characterized by two chemical shift at 38.5 ppm and 29.4 ppm.

Data analysis was performed using the in-built TOPSPIN 4.0.6 software. The most intense signals in the spectrum between −2.0 and −5.0 ppm and between −5.5 and −9.0 ppm were manually selected and intensity of each peak was determined.

Determination of BET Surface Area

BET surface area was determined according to the Brunauer-Emmett-Teller method as detailed in standard NF ISO 5794-1, Appendix E (June 2010) with the following adjustments: the sample was pre-dried at 200° C.±10° C.; the partial pressure used for the measurement $P/P^0$ was between 0.05 and 0.3.

Determination of the Particle Size Distribution and Particle Size by Centrifugal Sedimentation in a Disc Centrifuge (CPS)

Values of d50 were determined by centrifugal sedimentation in a disc centrifuge using a centrifugal photosedimentometer type "CPS DC 24000UHR", marketed by CPS Instruments company. This instrument is equipped with operating software supplied with the device (operating software version 11 g).

The same method and the same tools described in WO2018/202752A1 (paragraphs [00155]-[00178]) were employed for the determination of the d50 of the inventive silica.

EXAMPLES

Example 1

In a 25 L stainless steel reactor were introduced: 16.7 L of purified water, 260.2 g of $Na_2SO_4$ (solid). The solution was stirred and heated to reach 92° C. The entire reaction was carried out at this temperature. A 7.7 wt % sulfuric acid solution was metered into the reactor until the pH of the medium reached a value of 3.8.

Then, a sodium silicate solution ($SiO_2/Na_2O$ ratio=3.46; $SiO_2$ concentration=19.5 wt %, used during the whole process) was introduced over a period of 15 min at a flow rate of 112 g/min simultaneously with a 7.7% wt sulfuric acid solution. The flow rate of the sulfuric acid solution was regulated so that the pH of the reaction medium was maintained at a value of 4.1. After this step the sodium silicate solution was introduced at the same flow rate for 10 additional minutes, the pH was kept constant at 4.1 using 95% wt sulfuric acid.

The introduction of acid was stopped while the addition of the silicate was maintained at a flow rate of 123 g/min until the reaction medium reached a pH value of 8.0.

Simultaneously over a period of 8 min were metered into the reactor sodium silicate at a flow rate of 178 g/min and a 95 wt % sulfuric acid solution. The flow rate of the sulfuric acid solution was regulated so that the pH of the reaction medium was maintained at a value of 8.0. Then 331 g of a potassium methylsiliconate solution (SILRES® BS 16, Wacker Chemie AG; 50 wt %) was metered in the reaction medium over a period of 10 min while keeping the sodium silicate flow rate constant. The pH was maintained at pH of 8.0 using 95% wt sulfuric acid.

At the end of the simultaneous addition, the pH of the reaction medium was brought to 4.8 with sulfuric acid 95 wt %. The reaction mixture was allowed to stand for 5 minutes.

The silica suspension thus obtained was filtered and washed on a filter press. The filter cake thus obtained was disintegrated mechanically while water was added to reach a solid content of 15.4 wt %. The pH of the resulting silica suspension was brought to 6.2 with the addition of 7.7 wt % sulfuric acid solution. The resulting suspension was dried by means of a nozzle spray dryer to obtain precipitated silica 51. The properties of precipitated silica 51 are reported in Table 1.

Example 2

In a 25 L stainless steel reactor were introduced: 15.7 L of purified water, and 244.4 g of $Na_2SO_4$ (solid). The solution was stirred and heated to reach 92° C. The entire reaction was carried out at this temperature. A 7.7 wt % sulfuric acid solution was metered into the reactor until the pH of the medium reached a value of 3.8.

Then, a sodium silicate solution ($SiO_2/Na_2O$ ratio=3.46; $SiO_2$ concentration=19.5 wt %, used during the whole process) was introduced over a period of 15 min at a flow rate of 105 g/min simultaneously with a 7.7% wt sulfuric acid solution. The flow rate of the sulfuric acid solution was regulated so that the pH of the reaction medium was maintained at a value of 4.1. After this step the sodium silicate solution was introduced at the same flow rate for 10 additional minutes, the pH was kept constant at 4.1 using 95% wt sulfuric acid.

The introduction of acid was stopped while the addition of the silicate was maintained at a flow rate of 123 g/min until the reaction medium reached a pH value of 8.0.

Simultaneously over a period of 18 min were metered sodium silicate at a flow rate of 167 g/min and 95 wt % sulfuric acid solution. The flow rate of the sulfuric acid solution was regulated so that the pH of the reaction medium was maintained at a value of 8.0. Then 368 g of a potassium methylsiliconate solution (SILRES® BS 16, Wacker Chemie AG; 50 wt %) was metered to the reaction medium over the period of 10 min. The pH was maintained at pH value of 8.0 using 95% wt sulfuric acid.

At the end of the simultaneous addition, the pH of the reaction medium was brought to 4.8 with sulfuric acid 95 wt %. The reaction mixture was allowed to stand for 5 minutes.

The silica suspension thus obtained was filtered and washed on a filter press. The filter cake thus obtained was disintegrated mechanically while a while a sodium aluminate solution ($Al_2O_3$ concentration: 12 wt %) was added to obtain a $Al/SiO_2$ concentration of 3000 ppm. The pH of the resulting silica suspension was brought to 6.2 by the addition of 7.7 wt % sulfuric acid solution. The resulting suspension was dried by means of a nozzle spray dryer to obtain precipitated silica S2. The properties of precipitated silica S2 are reported in Table 1.

Example 3

In a 25 L stainless steel reactor were introduced: 16.7 L of purified water and 260.2 g of $Na_2SO_4$ (solid). The solution was stirred and heated to reach 92° C. The entire reaction was carried out at this temperature. A 7.7 wt % sulfuric acid solution was metered into the reactor until the pH of the medium reached a value of 3.8.

Then, a sodium silicate solution ($SiO_2/Na_2O$ ratio=3.46; $SiO_2$ concentration=19.5 wt %, used during the whole process) was introduced over a period of 15 min at a flow rate of 112 g/min simultaneously with a 7.7% wt sulfuric acid solution. The flow rate of the sulfuric acid solution was regulated so that the pH of the reaction medium was maintained at a value of 4.1. After this step the sodium silicate solution was introduced at the same flow rate for 10 additional minutes, the pH was kept constant at 4.1 using 95% wt sulfuric acid.

The introduction of acid was stopped while the addition of the silicate was maintained at a flow rate of 123 g/min until the reaction medium reached a pH value of 8.0.

Simultaneously over a period of 8 min were metered sodium silicate at a flow rate of 178 g/min and a 95 wt % sulfuric acid solution. The flow rate of the sulfuric acid solution was regulated so that the pH of the reaction medium was maintained at a value of 8.0. Then 993 g of a potassium methylsiliconate solution (SILRES® BS 16, Wacker Chemie AG; 50 wt %) was metered to the reaction medium over the period of 10 min while keeping the sodium silicate flow rate constant. The pH was maintained at the value of 8.0 using 95% wt sulfuric acid.

At the end of the simultaneous addition, the pH of the reaction medium was brought to 4.8 with sulfuric acid 95 wt %. The reaction mixture was allowed to stand for 5 minutes.

The silica suspension thus obtained was filtered and washed on a filter press. The filter cake thus obtained was disintegrated mechanically while water is added to reach a solid content at 15.4 wt %. The pH of the resulting silica suspension was brought to 6.2 by the addition of 7.7 wt % sulfuric acid solution. The resulting suspension was dried by means of a nozzle spray dryer to obtain precipitated silica S3. The properties of precipitated silica S3 are reported in Table 1.

TABLE 1

| Silica | CTAB ($m^2/g$) | BET ($m^2/g$) | d50 CPS (nm) | Carbon content (wt %) | Methyl resonances (ppm) | Ratio intensity |
|---|---|---|---|---|---|---|
| S1 | 184 | 213 | 130 | 0.4 | −4.6/−7.4 | 0.85 |
| S2 | 178 | 204 | 117 | 0.5 | −4.3/−7.2 | 1.37 |
| S3 | 168 | 223 | 125 | 1.2 | −4.7/−7.1 | 0.52 |
| CS1 | 199 | 221 | 99 | 0 | — | — |

Comparative silica CS1: a sample of Zeosil ® Premium 200MP (available from Solvay SA).

Example 4—Comparative Example 1

Silica S1 was evaluated in a SBR/BR matrix. The compositions, expressed as parts by weight per 100 parts of elastomers (phr), are described in Table 2 below.

TABLE 2

| Composition | Comp. Ex. 1 | Example 4 |
|---|---|---|
| sSBR(1) | 110.0 | 110.0 |
| BR(2) | 20.0 | 20.0 |
| CS1 | 85.0 | |
| S1 | | 85.0 |
| N234 | 3.0 | 3.0 |
| TESPD (3) | 7.7 | 7.2 |
| Resin (4) | 20.0 | 20.0 |
| 6-PPD (5) | 2.5 | 2.5 |
| Stearic Acid | 2.0 | 2.0 |
| ZnO | 1.2 | 1.2 |
| DPG (6) | 2.1 | 2.1 |
| CBS (7) | 2.3 | 2.3 |
| Sulfur | 1.7 | 1.7 |

(1)Oil extended solution SBR, Buna VSL4526-2HM from Lanxess with 45% of vinyl units; 26% of styrene units; Tg of −30° C., 37.5 phr of TDAE
(2)BR, Buna CB 25 from Lanxess
(3) Bis[3-(triethoxysilyl)propyl]disulfide, LuvomaxxTESPD from Lehmann&Voss&Co
(4) Sylvares TR5147, Arizona Chemical
(5) N-(1,3-Dimethylbutyl)-N-phenyl-para-phenylenediamine, Santoflex 6-PPD from Flexsys
(6) Diphenylguanidine, Rhenogran DPG-80 from RheinChemie
(7) N-Cyclohexyl-2-benzothiazolesulfenamide, Rhenogran CBS-80 from Rhein Chemie The process for the preparation of the rubber compositions was carried out in two successive preparation phases: a first phase of high-temperature thermomechanical working, followed by a second phase of mechanical working at temperatures of less than 110° C. to introduce the vulcanization system.

The first phase was carried out using a mixing device, of internal mixer type, of Brabender brand (capacity of 380 mL). In a first pass of the first phase the elastomers and the reinforcing filler (introduction in instalments) were mixed with the coupling agent, the resin, the DPG and the stearic acid. The duration was about 3 to 4 min30 and the dropping temperature was approximately 140-150° C. After cooling the mixture (temperature of less than 100° C.), a second pass made it possible to incorporate the zinc oxide and the protecting agents/antioxidants and to pursue the silanization. The duration of this pass was 4 minutes and the dropping temperatures of approximately 150-160° C.

After cooling the mixture (temperature of less than 100° C.), the vulcanization system (sulfur and accelerators, such as CBS) were added during the second phase. It was carried out on an open mill, preheated to 50° C. The duration of this phase was between 2 and 6 minutes. Each final mixture was subsequently calendered in the form of plaques with a thickness of 2-3 mm.

Mechanical Properties of the Vulcanisates

The measurements were carried out on vulcanized compositions cured 1 hour at 160° C.

The Shore A hardness measurement on the vulcanisates was carried out according to standard ASTM D 2240. The given value was measured at 3 seconds.

Uniaxial tensile tests were carried out in accordance with the instructions of the standard NF ISO 37 with test specimens of H2 type at a rate of 500 mm/min on an Instron 5564 device. The x % modulus, corresponding to the stress measured at x % of tensile strain, and the tensile strength are expressed in MPa; elongation at break is expressed in MPa.

The values for the loss factor (tan δ) and amplitude of elastic modulus in dynamic shear (ΔG') were recorded on vulcanized samples (parallelepipedal specimen of cross section 8 mm² and of height 7 mm). The sample was subjected to a double alternating sinusoidal shear strain at a temperature of 40° C. and at a frequency of 10 Hz. The strain amplitude sweeping processes were performed according to an outward-return cycle, proceeding outward from 0.1% to 50% and then returning from 50% to 0.1%. The values reported in Table 3 are obtained from the return strain amplitude scanning and concern the maximum value of the loss factor (tan δ max).

TABLE 3

|  |  | Comp. Ex. 1 | Example 4 |
|---|---|---|---|
| Shore A | pts | 61 | 60 |
| Modulus 100 | MPa | 2.7 | 2.6 |
| Modulus 300 | MPa | 13.3 | 12.7 |
| Tensile strength | MPa | 20.3 | 20.6 |
| Elongation at break | % | 405 | 426 |
| ΔG' | MPa | 1.8 | 1.4 |
| tanδ max | nu | 0.266 | 0.234 |

The composition containing the inventive silica exhibits significantly reduced energy dissipation values (ΔG' and tan δ max) and similar mechanical properties with respect to the composition of containing a precipitated silica according to the prior art.

The invention claimed is:

1. A precipitated silica comprising units of formula $[SiO_{4/2}]$ and units of formula $[(CH_3)SiO_{3/2}]$, wherein the $^{13}C$ NMR spectrum of the precipitated silica exhibits two resonance peaks assigned to the methyl group: a first peak in the region between −2.0 and −5.0 ppm and a second peak in the region between −5.5 and −9.0 ppm and wherein the ratio (intensity of the second peak)/(intensity of the first peak) is greater than 0.40 and wherein the precipitated silica comprises a median particle size d50 and a CTAB (cetyltributy-lammonium bromide) surface area such that |d50|>164.5−0.3*|CTAB| wherein |CTAB| represents the numerical value of the CTAB surface area expressed in m²/g and |d50| represents the numerical value of the median particle size d50 measured by centrifugal sedimentation and expressed in nm, wherein the CTAB surface area ranges from 40 to 600 m2/g.

2. The precipitated silica of claim 1 wherein the ratio (intensity of the second peak)/(intensity of the first peak) is between 0.50 and 1.60.

3. The precipitated silica of claim 1 wherein the precipitated silica comprises a carbon content of from 0.2 wt % to 10.0 wt % with respect to the total weight of silica.

4. A process for preparing the precipitated silica of claim 1, the process comprising: (i) providing a starting solution with a pH of between 2.0 and 5.0; (ii) simultaneously adding silicate and an acid to said starting solution, such that the pH of the resulting reaction medium is maintained between 2.0 and 5.0; (iii) stopping the addition of the acid, while continuing the addition of the silicate to the reaction medium until a pH value of the reaction medium of between 7.0 and 10.0 is obtained; (iv) simultaneously adding silicate and acid to the reaction medium obtained in (iii), such that the pH is maintained between 7.0 and 10.0; and (v) stopping the addition of the silicate while continuing the addition of the acid to the reaction medium until a pH value of the reaction medium of less than 6.0 is reached and a silica suspension is obtained; wherein at least one alkali metal methyl siliconate is metered into the reaction medium in step (iv) or (v).

5. The process according to claim 4 wherein step (v) comprises a first phase wherein the acid and the alkali metal methyl siliconate are simultaneously metered into the reaction medium at a pH between 7.0 and 10.0 followed by a second phase wherein the addition of the alkali metal methyl siliconate is stopped while the addition of the acid is continued and the pH of the reaction medium is allowed to decrease below 6.0.

6. The process of claim 4 wherein the at least one alkali metal methyl siliconate is sodium or potassium methyl siliconate.

7. A composition comprising the precipitated silica of claim 1 and at least one polymer.

8. An article comprising the precipitated silica of anyone of claim 1.

9. The article of claim 8, wherein the article is selected from the group consisting of a footwear sole, a floor covering, a gas barrier, a roller for cableways, a seal for domestic electrical appliances, a seal for liquid or gas pipes, a braking system seal, a pipe, and a sheathing.

10. The article of claim 8, wherein the article is selected from the group consisting of a thermal insulation material, a resorcinol-formaldehyde/silica composite, concrete, and paper.

11. A tire or tire element comprising the precipitated silica of claim 1.

* * * * *